United States Patent [19]
Tazai

[11] Patent Number: 5,846,158
[45] Date of Patent: Dec. 8, 1998

[54] SHIFT-LOCKING APPARATUS FOR COLUMN AT SHIFT LEVER

[75] Inventor: Akira Tazai, Aichi-ken, Japan

[73] Assignee: Mannoh Kogyo Co., Ltd., Anjo, Japan

[21] Appl. No.: 827,406

[22] Filed: Mar. 27, 1997

[51] Int. Cl.$^6$ .................................................. B60K 41/28
[52] U.S. Cl. ...................... 477/96; 192/220.2; 74/483 R; 74/473.21; 70/245
[58] Field of Search ............................. 192/4 A; 477/96, 477/99; 74/473.21, 473.23, 473.31, 483 R; 70/245, 247, 248, 252, 254

[56] References Cited

U.S. PATENT DOCUMENTS

| | | | |
|---|---|---|---|
| 4,991,700 | 2/1991 | Koga ........................................ | 192/4 A |
| 5,014,831 | 5/1991 | Wawra et al. ............................ | 192/4 A |
| 5,058,462 | 10/1991 | Killiany et al. . | |
| 5,511,641 | 4/1996 | Snell et al. ............................... | 192/4 A |
| 5,685,405 | 11/1997 | Morikawa et al. ...................... | 192/4 A |
| 5,695,429 | 12/1997 | Kataumi et al. ......................... | 477/96 |
| 5,752,414 | 5/1998 | Reasoner et al. ...................... | 74/483 R |
| 5,755,313 | 5/1998 | Kim ........................................ | 192/4 A |

FOREIGN PATENT DOCUMENTS

| | | |
|---|---|---|
| 5-33374 | 8/1993 | Japan . |
| 7-25260 | 1/1995 | Japan . |
| 7-101259 | 4/1995 | Japan . |

*Primary Examiner*—Richard M. Lorence
*Attorney, Agent, or Firm*—Frishauf, Holtz, Goodman, Langer & Chick

[57] ABSTRACT

A shift-locking apparatus for a column AT shift lever includes a shift-locking box arranged at a side of a brake pedal, a key-interlocking cable having a first end engaged with an interlocking block of a key cylinder and a second end engaged with a slider housed in the shift-locking box, and a shift-locking cable having a first end engaged with a shift-locking pin of a shift lever assembly and a second end engaged with the slider housed in the shift-locking box. Spherical members are provided at the second end of the key-interlocking cable and the second end of the shift-locking cable, respectively, and the engagements between the slider and the key-interlocking cable and the slider and the shift-locking cable are achieved by rotatably contacting the spherical members with respective spherical bearing seats provided in the slider. The slider is housed in the shift-locking box so as to be rotatable therein with the spherical members acting as a fulcrum, and so as to also be horizontally movable within the shift-locking box in right and left directions. A first spring is provided side by side with the slider for forcibly pushing the slider toward the side of the brake pedal. A stopper is provided on the slider at a position such that teeth formed on the stopper are engaged with teeth provided on an inner wall surface of the shift-locking box when the slider is rotated. And a second spring, having an anti-compressive force smaller than that of the first spring, is housed in the shift lever assembly for forcibly pushing the shift-locking pin in a pulling direction of the shift-locking cable.

3 Claims, 8 Drawing Sheets

SHIFT-LOCKING APPARATUS FOR COLUMN AT SHIFT LEVER

BACKGROUND OF THE INVENTION

This invention relates to an improved shift-locking apparatus for a column AT shift lever for automobiles.

A shift-locking apparatus for a column AT shift lever is a locking apparatus for preventing a key from being turned to a locking position when a shift lever is in a position other than a parking position (hereinafter referred to as "the P position") and preventing the shift lever from being moved from the P position when the key is in a locking position.

The conventional shift-locking apparatus has a structure such that each of a second end of a key-interlocking cable (having a first end engaged with a key cylinder) and a second end of a shift-locking cable (having a first end engaged with a shift lever assembly) are wired to a shift-locking box arranged at a brake pedal side and fixed to a slider in said shift-locking box. This conventional shift-locking apparatus acts as described below.

In the case where the shift lever is in the P position, when the key is turned from an ACC position to a LOCK position, the key-interlocking cable is pulled toward a key cylinder side by the action of a cam in the key cylinder. Since both the second end of the key-interlocking cable and the second end of the shift-locking cable are fixed to the slider, the shift-locking cable is pushed out toward a shift lever side by interlocking with the action of the key-interlocking cable to protrude a shift-locking pin, with which the first end of the shift-locking cable is engaged, to a shift-locking portion of a shift lever assembly, whereby selective operation of the shift lever cannot be carried out.

To the contrary, in the case where the shift lever is in a position other than the P position, the shift-locking pin touches a shift-locking pin-sliding portion of the shift lever, and the shift-locking cable is pushed toward a shift-locking box side. Therefore, the slider is moved toward the brake pedal side, and even if it is attempted to turn the key from the ACC position to the LOCK position, the key-interlocking cable does not move, whereby the key cannot be turned to the LOCK position.

In the conventional shift-locking apparatus described above, pushing force and pulling force are applied to the shift-locking cable, so that it is necessary to use a push-pull type cable. In the push-pull type cable, force is transmitted by sliding an inner cable relative to an outer cable, so that wiring of the cable is considerably limited. In addition the sliding resistance of the cable is increased depending on the way in which the cable is wired, whereby it is necessary to enlarge the anti-compressive force of a return spring of the brake pedal in consideration of such increase in the sliding resistance. Further, in order to prevent the possibility that even when the shift lever is in a position other than the P position, the key is turned to the LOCK position due to variation of the length of the inner cable relative to that of the outer cable, fine adjustment of the assembling length of the shift-locking cable relative to the shift lever assembly is required.

SUMMARY OF THE INVENTION

An object of the present invention is to provide a shift-locking apparatus for a column AT shift lever, in which the above problems in the prior art are solved and a pull cable can be used as a shift-locking cable, whereby limitations with respect to the wiring of a cable are reduced and whereby fine adjustment of the assembling length of a shift-locking cable is not required.

That is, the present invention is achieved by a shift-locking apparatus for a column AT shift lever, which comprises:

a shift-locking box (5) arranged at the side of a brake pedal (13);

a key-interlocking cable (1) having one end engaged with an interlocking block (4) of a key cylinder (3) and the other end engaged with a slider (6) housed in the shift-locking box (5); and a shift-locking cable (2) having one end engaged with a shift-locking pin (10) of a shift lever assembly (14) and the other end engaged with the slider (6) housed in the shift-locking box (5), wherein said key-interlocking cable and said shift-locking cable are pull type cables;

the engagement between said slider and said key-interlocking cable and said shift-locking cable is made by the combination of two spherical bearing seats provided in said slider and spherical members joined with the respective other ends of said key-interlocking cable and shift-locking cable, respectively and said spherical members are rotatable, respectively while they are contacted with said spherical bearing seats;

said slider is housed in said shift-locking box so that said slider is rotatable on a plain face in said slider with said spherical members being a fulcrum and also movable horizontally in the right and left directions in said shift-locking box, is forcibly pushed toward the side of the brake pedal by a first spring (9) provided side by side with said slider and is integrated with a stopper (7) provided at such a position that teeth 7a provided on said stopper are engaged with teeth (7b) provided on the inner wall surface of said shift-locking box when said slider is rotated;

a second spring (11) which forcibly pushes said shift-locking pin toward the pulling direction of said shift-locking cable is housed in said shift lever assembly; and the anti-compressive force of said second spring is smaller than that of said first spring. Here, it is preferred that the number of the teeth (7a) formed on the stopper (7) is smaller than the number of the teeth (7b) formed on the inner wall surface of the shift-locking box (5).

DESCRIPTION OF THE PREFERRED EMBODIMENTS

Figure 1:
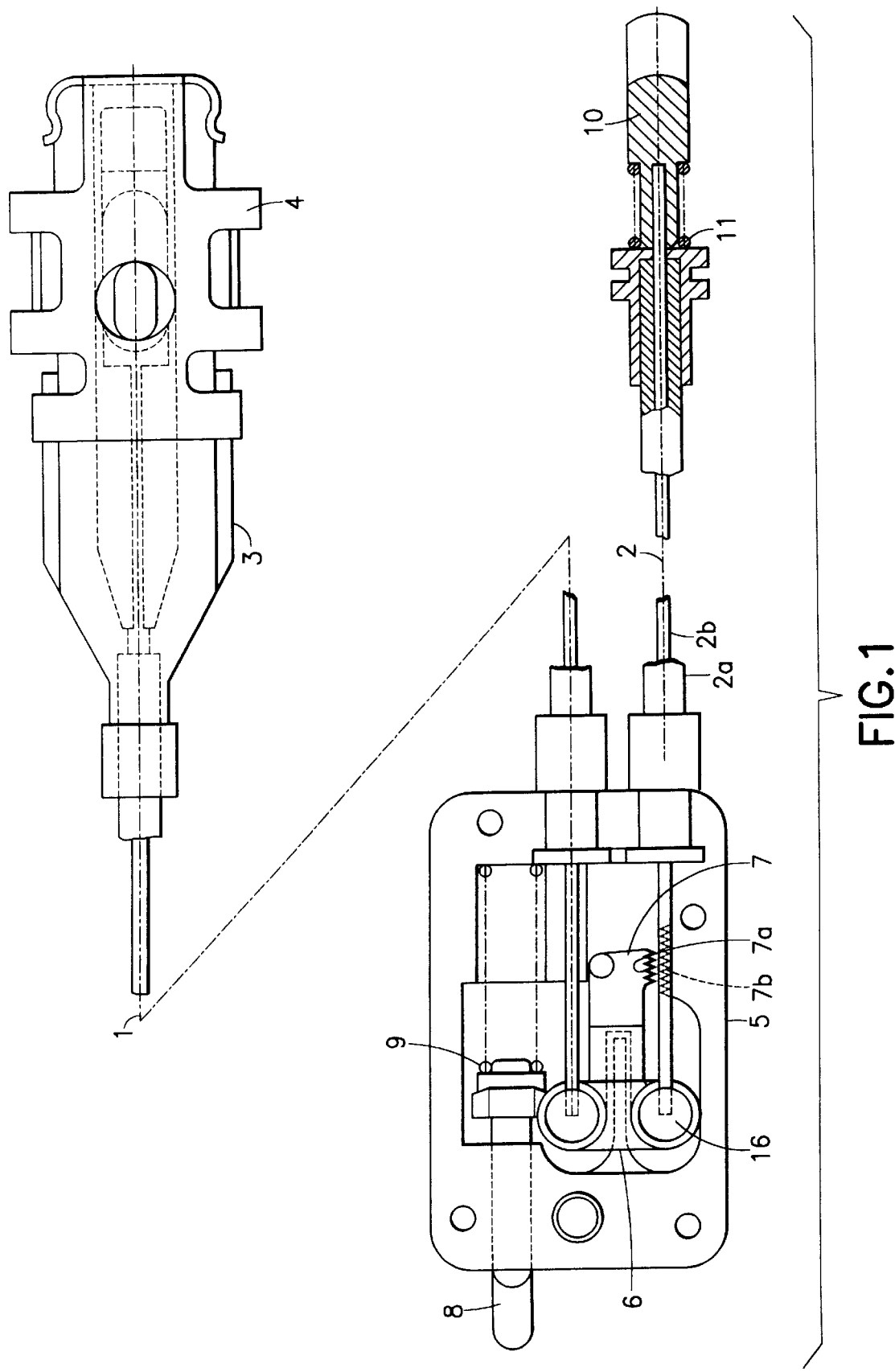
FIG. 1 is a view illustrating the system of the present invention.

In the following, the present invention is explained in detail by referring to the drawings showing a preferred embodiment of the present invention.

FIG. 1 is a view illustrating the system of the present invention. 1 is a key-interlocking cable, and 2 is a shift-locking cable. One end, i.e., an end at a key cylinder side, of the key-interlocking cable 1 is engaged with an interlocking block 4 of a key cylinder 3. The other end, i.e., an end at a brake pedal side, of the key-interlocking cable 1 is wired in a shift-locking box 5 arranged at the brake pedal side.

Figure 4:
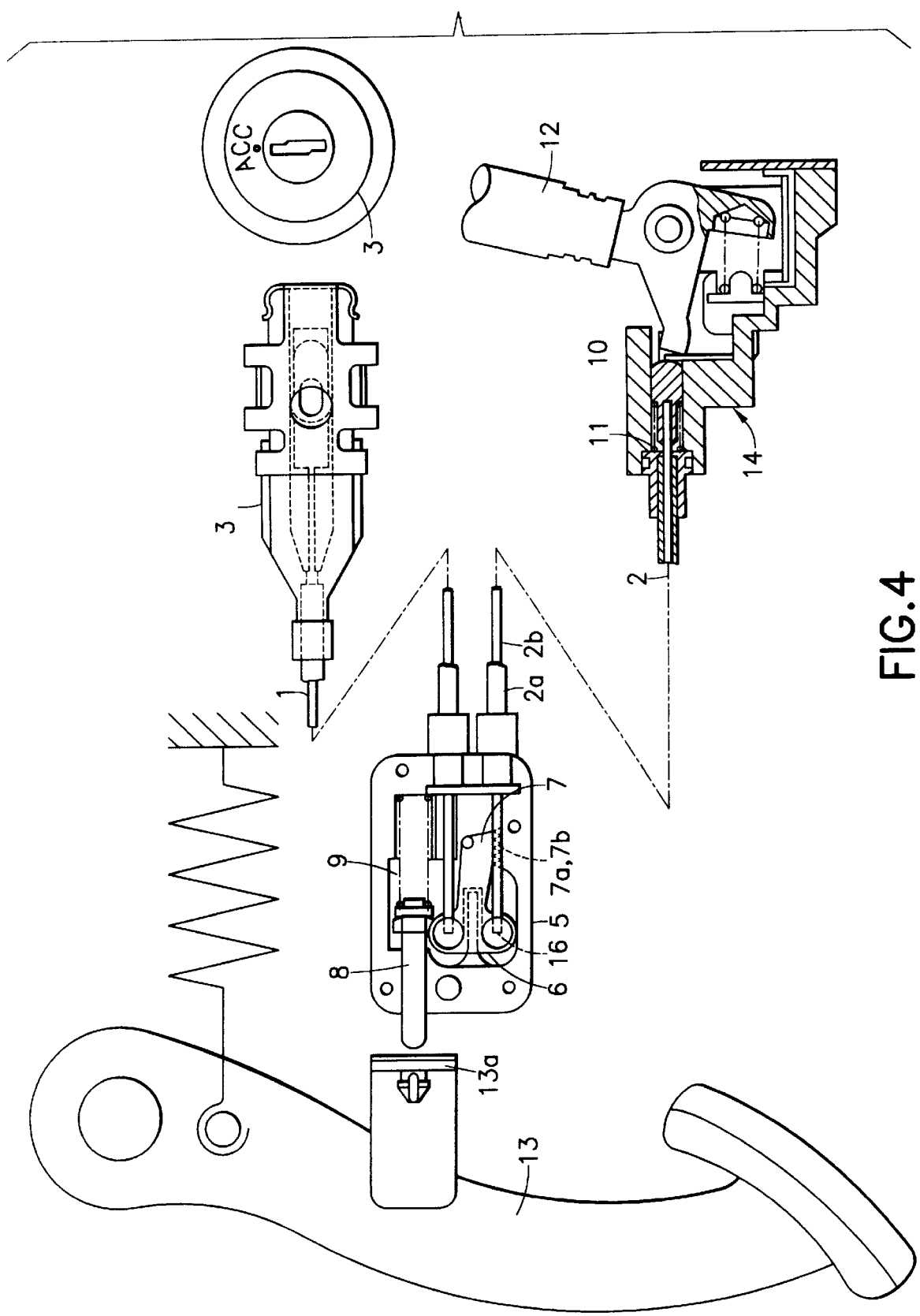
FIG. 4 is a view showing the states of a slider, a slide pin and a shift-locking pin in relation to the state of a brake when a key is turned in the direction of ACC and a brake pedal is worked.
Figure 5:
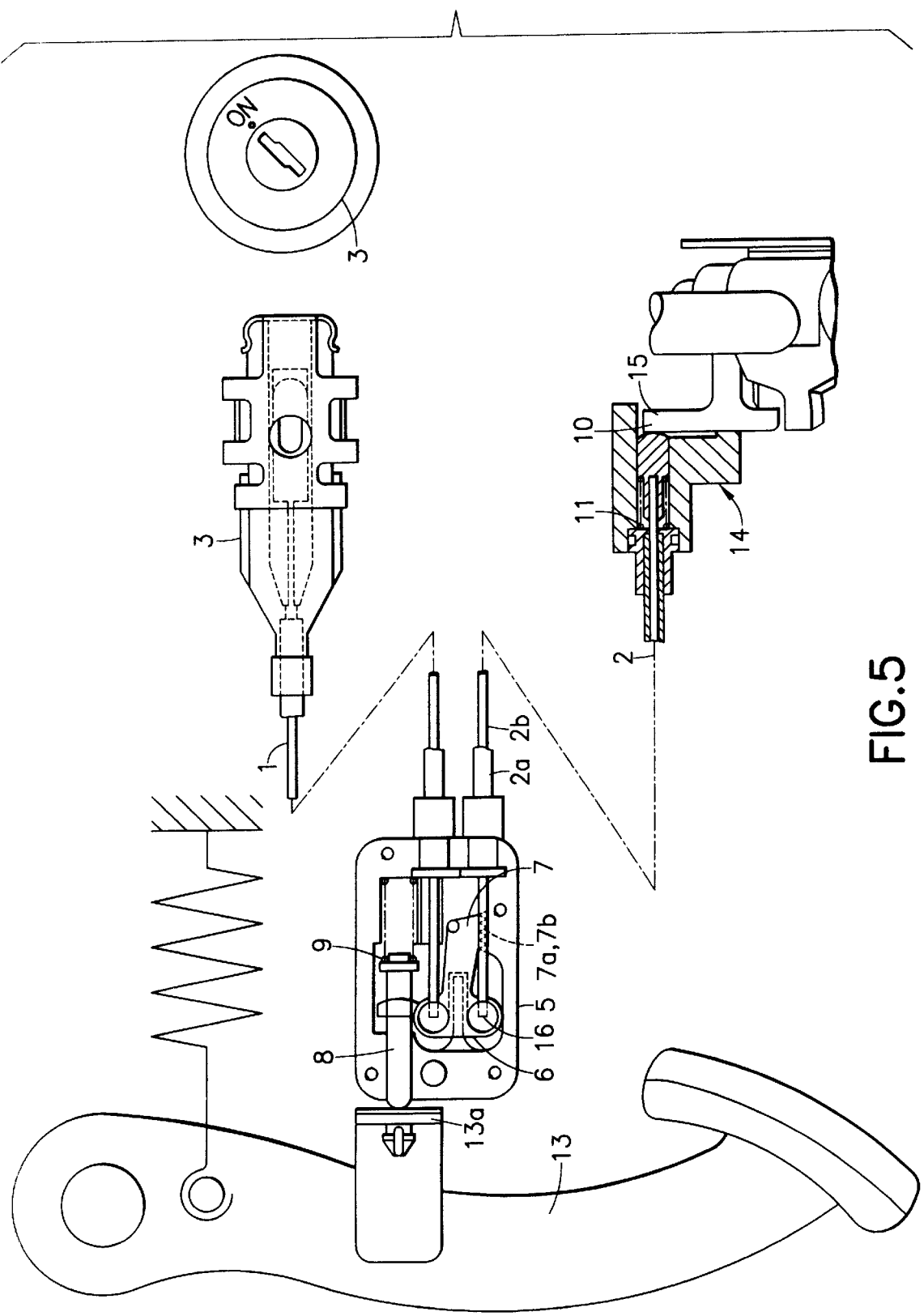
FIG. 5 is a view showing the states of a slider, a slide pin and a shift-locking pin in relation to the state of a brake during driving.
Figure 6A:
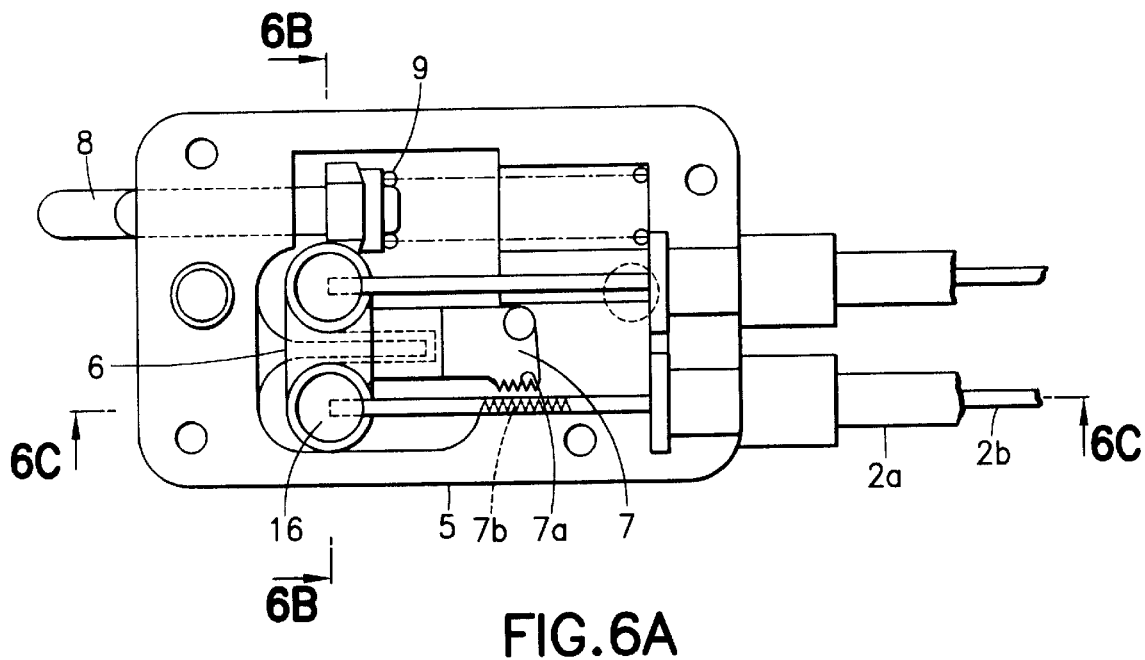
FIGS. 6A–6C are schematic views showing an engagement between a spherical bearing seat of a slider and a spherical member of a shift-locking cable.
Figure 6B:
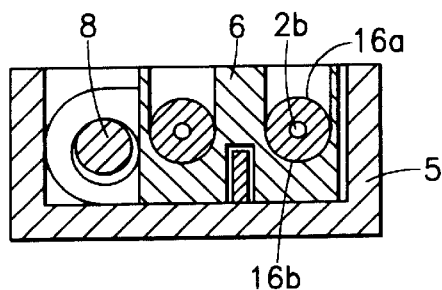
Figure 6C:
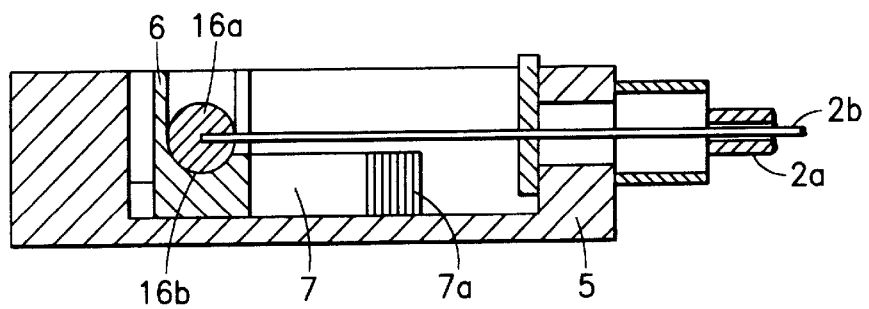

In the inner portion of the shift-locking box 5, a slider 6 which is slidable in the axis direction of a cable in the shift-locking box 5 is provided. The other end of the key-interlocking cable 1 and the other end of the shift-locking cable 2 are joined with spherical members 16a, respectively, and said spherical members are engaged with spherical bearing seats 16b provided at the upper and lower portions of the left side of the slider 6 so that said spherical members are rotatable while they are contacted with said spherical bearing seats (see FIGS. 6A–6C which show the engagement in detail). The slider 6 is integrated with a stopper 7 having a tip end equipped with teeth 7a (see each right lower portion of the shift-locking box 5 of FIG. 2 to FIG. 5). When only the key-interlocking cable 1 is pulled toward the key cylinder side in the state of FIG. 1, the stopper 7 is slightly rotated clockwisely together with the slider 6 with a spherical bearing-joining portion 16 of the slider 6 and the shift-locking cable 2 being as a fulcrum, due to clockwise rotational torque applied to the slider 6, and the teeth 7a formed on the stopper 7 are engaged with teeth 7b formed at a position opposed to the teeth 7a, at the side of the shift-locking box 5, whereby the slider 6 can be locked so that the slider 6 does not slide in the right direction (FIG. 4 and FIG. 5 show such a state). By making the number of the teeth 7b at the side of the shift-locking box 5 larger than the number of the teeth 7a at the side of the stopper 7, the slider 6 can be securely locked even when the engagement position of the stopper 7 is out of position to some extent, whereby the system will operate even if there is some manufacturing variation of the length of an inner cable 2b relative to that of an outer cable 2b.

At the upper portion of the slider 6, there is inserted a slide pin 8 which is not integrated with the slider 6 and has an axis in parallel with the right and left moving directions of the slider 6. The slide pin 8 is always pushed forcibly from the shift-locking box 5 toward the brake pedal side (the left side of FIG. 1) by a first spring 9. As a result, the upper portion of the slider 6 engaged with the slide pin 8 is also forcibly pushed toward the brake pedal side. On the other hand, one end, i.e., an end at a shift lever side, of the shift-locking cable 2 is engaged with a shift-locking pin 10. The shift-locking pin 10 is always pushed forcibly in the protruding direction toward the shift lever side (the right side of FIG. 1), by a second spring 11 (the anti-compressive force of which is smaller than that of the first spring 1, as will be described below). Thus, the shift-locking cable 2 is in a state such that it is always pulled from both sides by the first spring 9 and the second spring 11 arranged at both ends thereof.

In the following, the action of the apparatus is explained.

Figure 2:
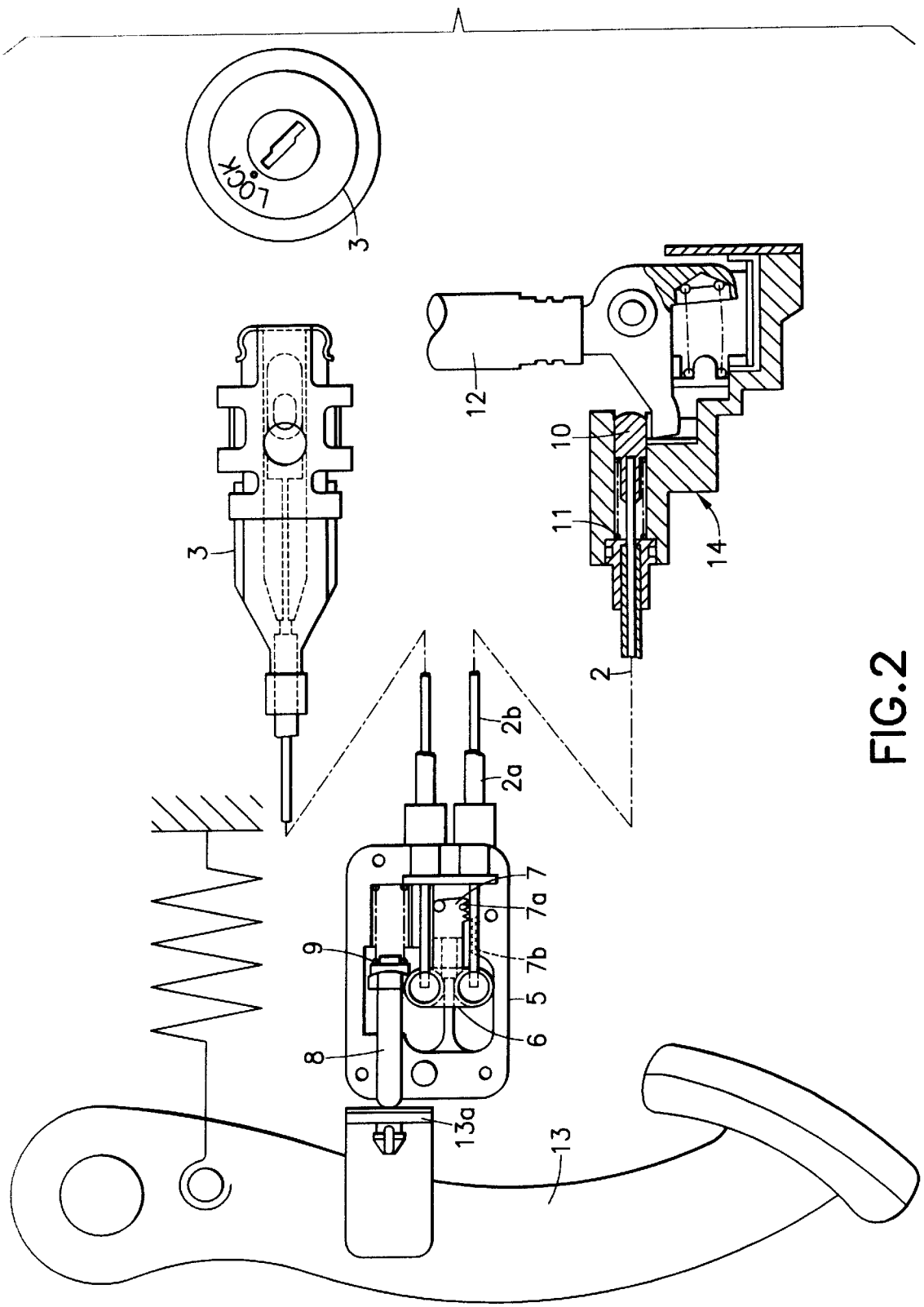
FIG. 2 is a view showing the states of a slider, a slide pin and a shift-locking pin in relation to the state of a brake during parking.
Figure 7:
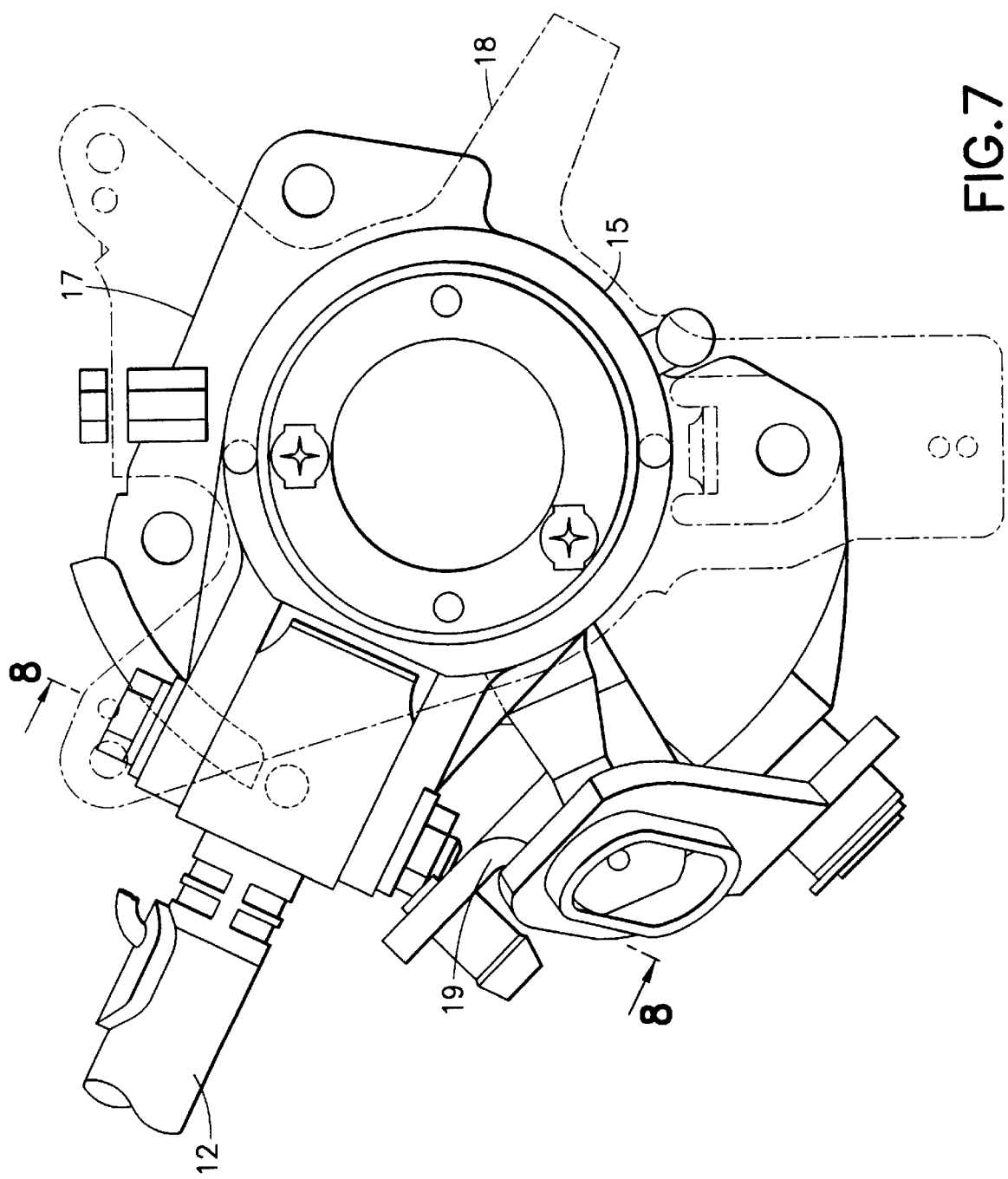
FIG. 7 is a side view of a shift lever assembly.
Figure 8:
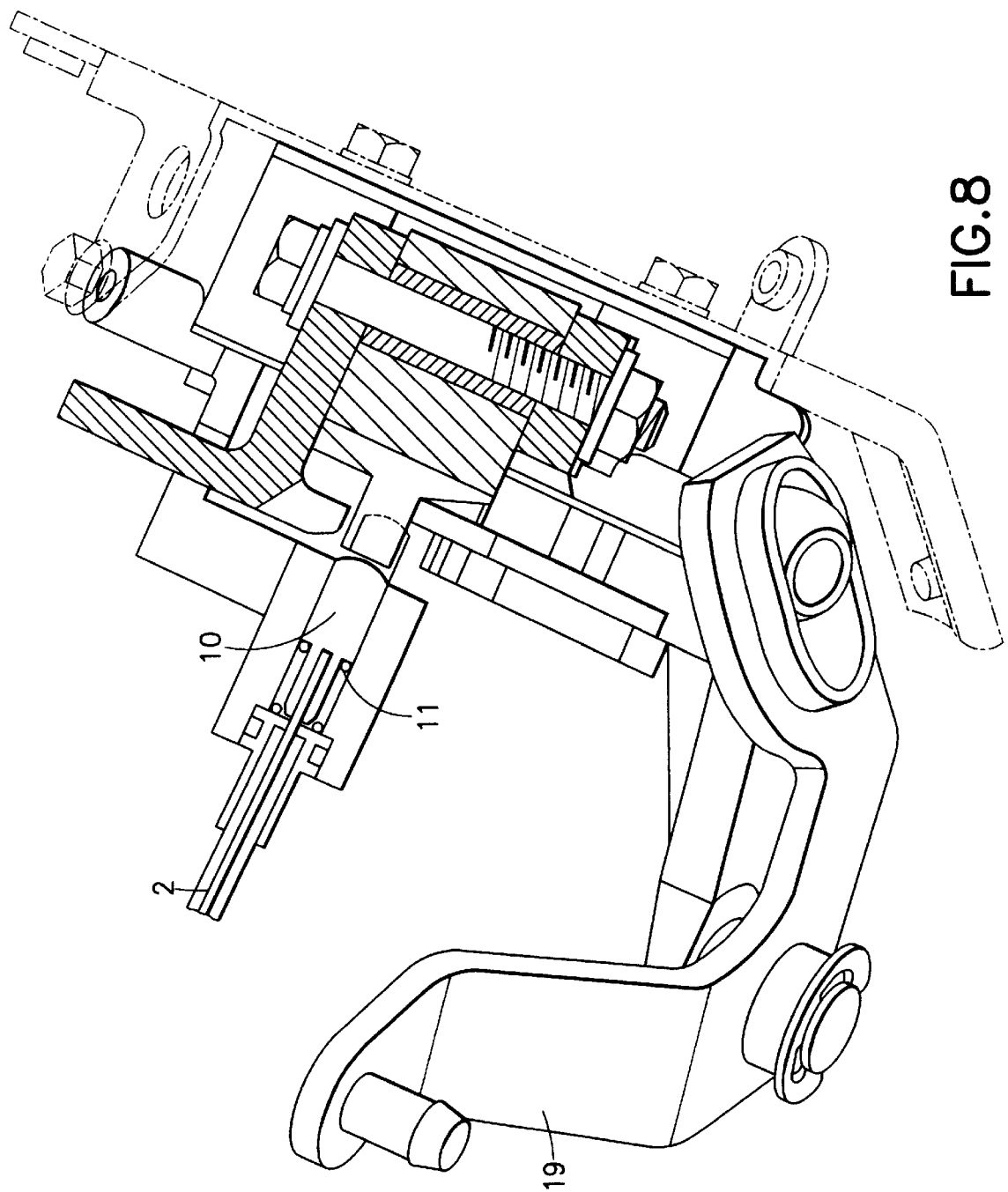
FIG. 8 is a sectional view along 8—8 of FIG. 7.

FIG. 2 shows a state during parking. A key is in a LOCK position, a shift lever 12 is in the P position, and a brake pedal 13 is in an OFF position. At that time, similarly as in the prior art, the key-interlocking cable 1 is pulled toward the side of the key cylinder 3 by the action of a cam, and the shift-locking cable 2 is also moved toward the shift lever side, whereby the shift-locking pin 10 engaged with one end of the shift-locking cable 2 is protruded to a shift-locking portion of a shift lever assembly 14. Therefore, in this state, selection operation of the shift lever 12 cannot be carried out, and the shift lever 12 cannot be moved from the P position. In FIG. 7 and FIG. 8, the structure of the shift lever assembly 14 is shown. Here, 15 is an arm shift lever, 17 is a retainer, 18 is a combination bracket, and 19 is a bell crank.

Figure 3:
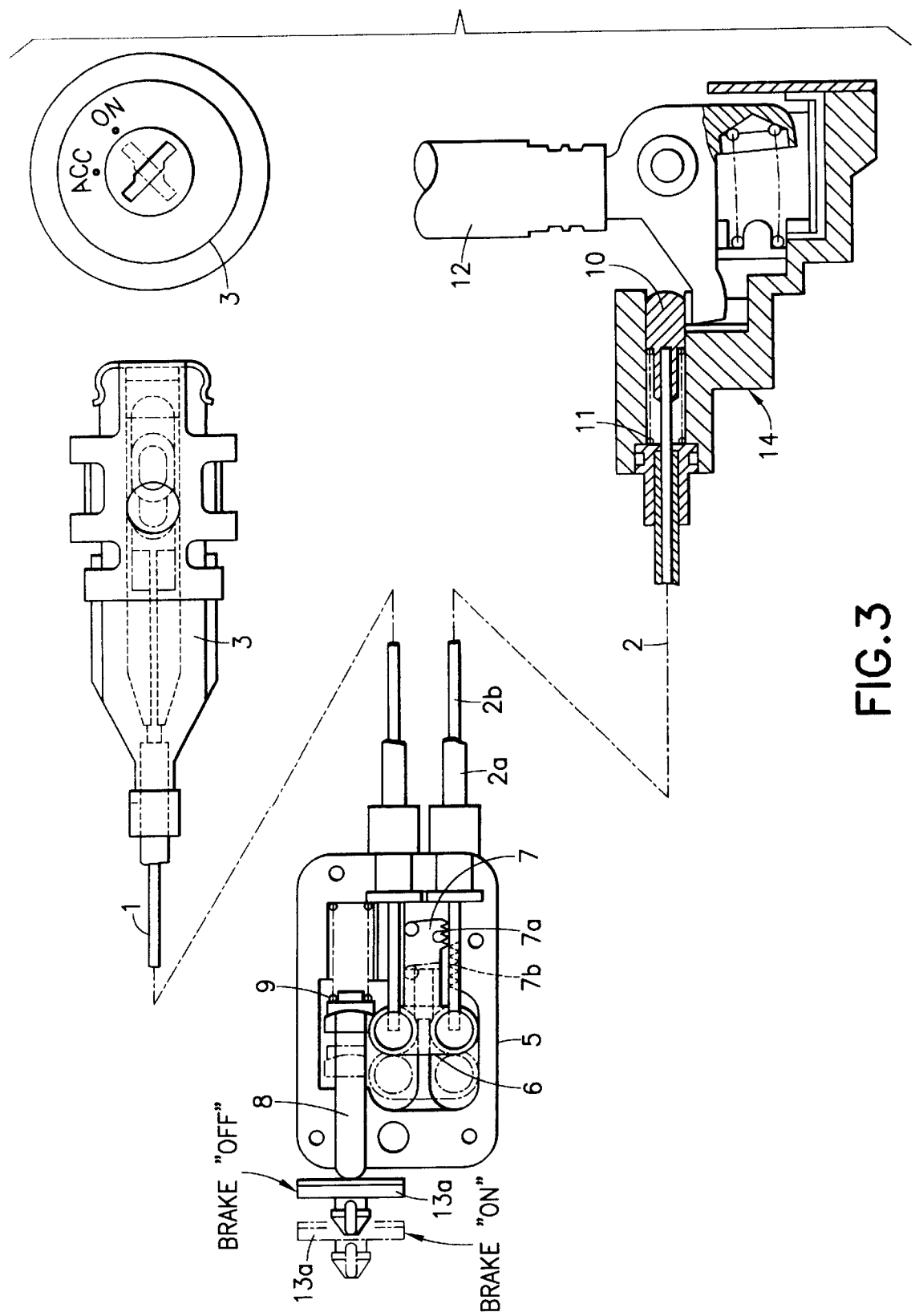
FIG. 3 is a view showing the states of a slider, a slide pin and a shift-locking pin in relation to the state of a brake when a key is turned in the direction of ACC.

Next, a state of starting in a parked car is shown in FIG. 3. That is, when the key is turned in the direction of ACC in the state of FIG. 2, restraint of the key-interlocking cable 1 by the action of the cam in the key cylinder 3 is canceled. However, in a state that the brake pedal 13 is not worked, due to the action of a strong return spring of the brake pedal 13, the slide pin 8 is pushed to a solid line position via a slide pin-pushing bush 13a against the anti-compressive force of the first spring 9, and the force of the first spring 9 is not applied to the shift-locking cable 2. Therefore, by the anti-compressive force of the second spring 11, the shift-locking pin 10 is left to be protruded to the shift-locking portion of the shift lever assembly 14, so that selection operation cannot be carried out.

However, when the brake pedal 13 is worked in the state of FIG. 3, the anti-compressive force of the return spring is not applied to the slide pin 8. As a result, only the anti-compressive forces of the first spring 9 and the second spring 11 are applied to both ends of the shift-locking cable 2. However, since the anti-compressive force of the first spring 9 is made stronger than that of the second spring 11, the shift-locking cable 2 is moved toward the brake pedal side as shown by a broken line. Therefore, as shown in FIG. 4, the shift-locking pin 10 is moved backward (moved to the left side in FIG. 4) from the shift-locking portion of the shift lever assembly 14, locking of the shift lever 12 is released, so that the shift lever 12 can be moved to another position. As described above, in order to move the shift lever 12 from the P position, it is required that after the key is turned to the position of ACC to START, the brake pedal 13 is worked.

When the shift lever 12 is moved to a position other than the P position in this state and the brake pedal 13 is released, the shift-locking cable 2 is moved toward the side of the shift lever 12 and the shift-locking pin 10 touches the arm shift lever 15 of the shift lever 12 as shown in FIG. 5. Therefore, locking of the shift lever 12 is left to be released, so that the shift lever 12 can be moved between positions other than the P position. When the brake pedal 13 is further released, only the slide pin 8 is pushed against the anti-compressive force of the first spring 9, so that the brake pedal 13 can be returned to a predetermined position.

In the state of FIG. 5, i.e., in a state that the shift lever 12 is in a position other than the P position, when it is tried to turn the key to the LOCK position, the key-interlocking cable 1 is pulled toward the key cylinder side by the action of the cam of the key cylinder 3. However, the shift-locking pin 10 cannot be moved toward the shift lever side (the right side in FIG. 5) exceeding a position at which the shift-locking pin 10 touches the arm shift lever 15, so that the shift-locking cable 2 is kept at the position in FIG. 5, and only the key-interlocking cable 1 is pulled toward the key cylinder side.

Therefore, the stopper 7 of the slider 6 is slightly rotated clockwisely together with the slider 6 with the spherical bearing-joining portion 16 of the slider 6 and the shift-locking cable 2 being as a fulcrum, and the teeth 7a of the stopper 7 are engaged with the teeth 7b at the side of the shift-locking box 5 to prevent the slider 6 from sliding in the right direction. As a result, the key-interlocking cable 1 cannot be pulled out, so that in a state that the shift lever 12 is in a position other than the P position, the key cannot be turned to the LOCK position.

As described above, in the apparatus of the present invention, the slider 6 is immediately locked when only the key-interlocking cable 1 is pulled toward the key cylinder side, so that a pushing force toward the shift lever side need not be applied to the shift-locking cable 2. Therefore, the shift-locking cable 2 of the present invention can be achieved using a pull type cable. Further, the number of the teeth 7a at the side of the stopper 7 is smaller than that of the teeth 7b at the side of the shift-locking box 5 so that the slider 6 can be securely locked even when the engagement position between the teeth 7a of the stopper 7 of the slider 6 and the teeth 7b at the side of the shift-locking box 5 is out of position to some extent. Therefore, there are advantages in that limitations with respect to the wiring of a cable caused by using a push-pull type cable as in the prior art are canceled, and in that fine adjustment of the assembling length of a shift-locking cable for overcoming manufacturing variation is not required.

I claim:

1. A shift-locking apparatus for a column AT shift lever, comprising:

a shift-locking box arranged at a side of a brake pedal;

a key-interlocking cable having a first end engaged with an interlocking block of a key cylinder and a second end engaged with a slider housed in the shift-locking box; and a shift-locking cable having a first end engaged with a shift-locking pin of a shift lever assembly and a second end engaged with the slider housed in the shift-locking box;

wherein spherical members are provided at the second end of the key-interlocking cable and the second end of the shift-locking cable, respectively, and the engagements between the slider and the key-interlocking cable and the slider and the shift-locking cable are achieved by rotatably contacting the spherical members with respective spherical bearing seats provided in the slider;

wherein the slider is housed in the shift-locking box so as to be rotatable therein with the spherical members acting as a fulcrum, and so as to also be horizontally movable within the shift-locking box in right and left directions;

wherein a first spring is provided side by side with the slider for forcibly pushing the slider toward the side of the brake pedal;

wherein a stopper is provided on the slider at a position such that teeth formed on the stopper are engaged with teeth provided on an inner wall surface of the shift-locking box when the slider is rotated; and wherein a second spring, having an anti-compressive force smaller than an anti-compressive force of the first spring, is housed in the shift lever assembly for forcibly pushing the shift-locking pin in a pulling direction of the shift-locking cable.

2. The shift-locking apparatus of claim 1, wherein the teeth formed on the stopper are fewer in number than the teeth provided on the inner wall surface of the shift-locking box.

3. The shift-locking apparatus of claim 1, wherein the key-interlocking cable and the shift-locking cable comprise cables which are capable of exerting a pulling force but which need not exert a pushing force.

* * * * *